US012422871B2

(12) United States Patent
Lin

(10) Patent No.: US 12,422,871 B2
(45) Date of Patent: Sep. 23, 2025

(54) LOW-POWER FLOATING-RAIL REFERENCE GENERATOR

(71) Applicant: Cypress Semiconductor Corporation, San Jose, CA (US)

(72) Inventor: Adrian Lin, Austin, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 275 days.

(21) Appl. No.: 18/307,328

(22) Filed: Apr. 26, 2023

(65) Prior Publication Data

US 2024/0361790 A1 Oct. 31, 2024

(51) Int. Cl.
*G05F 1/56* (2006.01)
*G05F 1/46* (2006.01)

(52) U.S. Cl.
CPC .............. *G05F 1/562* (2013.01); *G05F 1/465* (2013.01)

(58) Field of Classification Search
CPC . G05F 1/462; G05F 1/465; G05F 1/56; G05F 1/575; G05F 3/16
See application file for complete search history.

(56) References Cited

U.S. PATENT DOCUMENTS

2006/0033481 A1* 2/2006 Thiele ..................... G05F 3/262 323/266
2006/0164152 A1* 7/2006 Tschanz .................. G05F 3/205 327/530
2010/0073070 A1* 3/2010 Ng ............................ G05F 3/30 327/539
2015/0022177 A1* 1/2015 Petrovic .................... G05F 1/56 323/303

FOREIGN PATENT DOCUMENTS

CN 109976430 A * 7/2019

OTHER PUBLICATIONS

Translation of CN109976430A by Clarivate Analytics Mar. 2025, 7 pages.*

* cited by examiner

*Primary Examiner* — Harry R Behm

(57) ABSTRACT

A floating-rail reference generator and method of operating the same are provided. Generally, the generator includes a tracking current source coupled in series with a current scaling resistor between an input voltage ($V_{BAT}$) and ground. The tracking current source is operable to receive a reference voltage and couple a tracking current through the resistor to produce a floating-rail reference voltage ($V_{SSHV\_REF}$) at an output between the tracking current source and scaling resistor, wherein: $V_{SSHV\_REF}=((V_{BAT}-V_{GS})/k)\cdot 1/R\cdot k\cdot R$, where $V_{GS}$ is a desired constant potential difference between $V_{BAT}$ and $V_{SSHV\_REF}$, k is a voltage scaling ratio, and R is a resistance of the current scaling resistor. In some embodiments, the tracking current source includes a transistor coupled between $V_{BAT}$ and the output, and controlled by a differential amplifier.

18 Claims, 7 Drawing Sheets

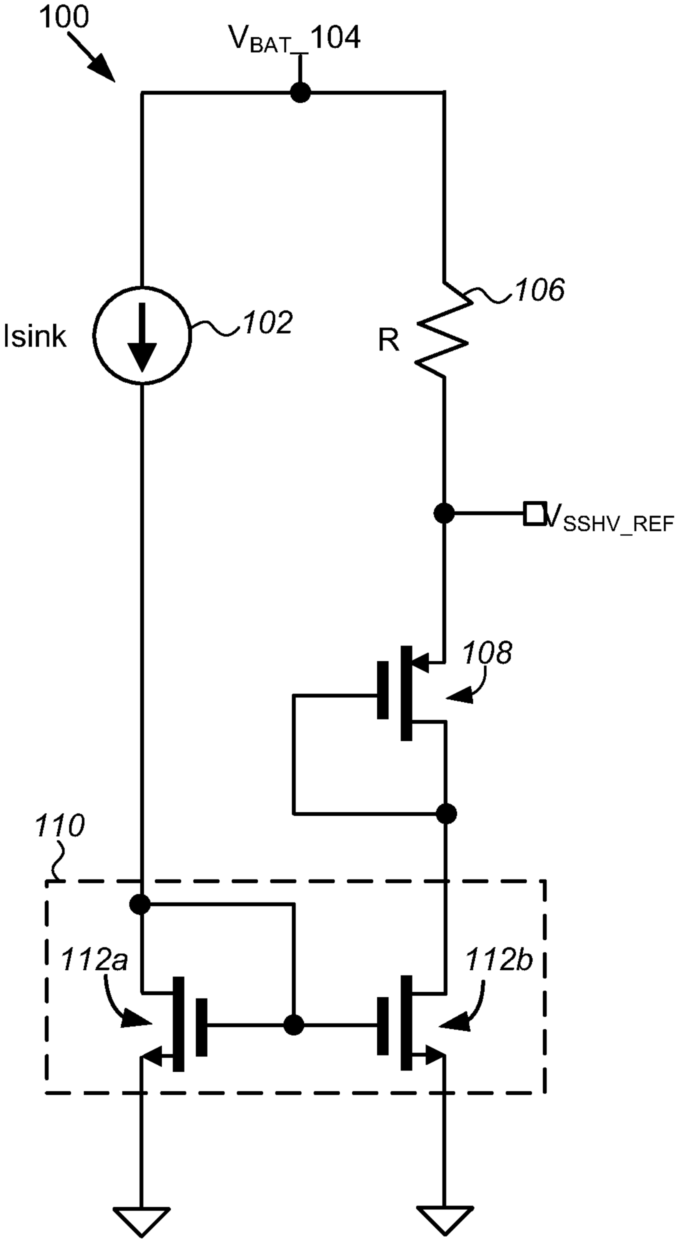
FIG. 1
(conventional)

LOW-POWER FLOATING-RAIL REFERENCE GENERATOR

TECHNICAL FIELD

This present disclosure relates generally to voltage reference generators, and more particularly to a low-power floating-rail reference generator for use in a power management unit or switching regulator.

BACKGROUND

Many electronic products, such as Bluetooth radios, automotive systems, and Wi-Fi hubs and receivers include microcontroller units (MCU) or programmable systems on a chip (PSoC), in which a processor unit, memory, and communication interfaces and peripherals are integrally formed as a single integrated circuit (IC) or die with a power management unit (PMU) or Switching Regulator (SR) designed to provide stable, noise free DC voltage to logic devices in the IC. Typically, the logic devices are fabricated using metal-oxide-semiconductor field-effect (MOS) transistors capable of operating with gate-to-source voltage of about 1.8 volts (V) across their gate oxides (Gox), i.e., 1.8V Gox devices. In the past the PMU or SR could be fabricated on the same IC using 2.5V Gox devices, which were required to allow continuous operation at battery or DC input voltages ranging from 1.6V to 4.8 V. However, as semiconductor fabrication technologies shrink the size of logic MOS devices to 28 nanometers (nm) or 22 nm and beyond, process limitations prevents the use of 2.5V Gox and 1.8V Gox devices in the same die, thus only 1.8V Gox devices are available to use for both the logic devices of the MCU and power transistors or devices of the PMU or SR. With only 1.8V Gox devices available for use, the PMU or SR must use a floating-rail architecture to limit the gate-to-source voltage across the power transistors or devices to 1.8 V.

However, state-of-the-art floating-rail architectures are limited to operating with a minimum battery or DC input voltage of 2.7V instead of 1.6 V, the lower voltage of ranges with which many portable devices are required to operate. To date there has been no solution that allows continuous PMU or SR operation with battery or DC input voltages of 1.6 V to 4.8 V.

FIG. 1 is a schematic diagram of a conventional architecture for a floating-rail 100 including a current source 102 coupled between a DC voltage ($V_{BAT}$ 104) and ground in a first leg, and in parallel with a series connected resistor 106 and diode connected p-type or p-channel MOS (PMOS) transistor 108 in a second leg. A current sink 110 including first and second n-type or n-channel MOS transistor (NMOS 112*a* and 112*b*) configured current in the second leg with a sink current (Isink) mirrors through the NMOS in the first leg. The floating-rail voltage ($V_{SSHV\_REF}$) is taken from a node between the resistor 106 and PMOS 108. Thus, the sink current through the NMOS 112*a* and 112*b*, and the diode voltage dropped across the PMOS 108 limit the battery voltage $V_{BAT}$) to a minimum of 2.7 V in order to maintain floating-rail voltage ($V_{SSHV\_REF}$) of 1.8V, as required for logic devices in 28 nm and 22 nm technologies and beyond.

Accordingly, there is a need for a low-power floating-rail reference generator and method for operating the same to provide a stable floating-rail voltage ($V_{SSHV\_REF}$) of 1.8V for MCUs including an integrated PMU or SR. It is further desirable that ow-power floating-rail reference generator is operable at continuous DC input voltage or battery voltages of from about 1.6V to 4.8V.

SUMMARY

A low-power floating-rail reference generator and method are provided for use in a power management unit or switching regulator. Generally, the reference generator includes a tracking current source coupled in series with a current scaling resistor between an input voltage ($V_{BAT}$) and ground. The tracking current source is operable to receive a reference voltage and generate a tracking current (Isource) through the current scaling resistor to produce a floating-rail reference voltage ($V_{SSHV\_REF}$) at an output between the tracking current source current and scaling resistor, wherein:

$$V_{SSHV\_REF} = \left(\frac{V_{BAT}}{k} - \frac{V_{GS}}{k}\right) \cdot \frac{1}{R} \cdot k \cdot R$$

where $V_{GS}$ is a preselected constant potential difference between $V_{BAT}$ and $V_{SSHV\_REF}$, k is a voltage scaling ratio, and R is a resistance of the current scaling resistor. $V_{GS}$ represents a desired maximum gate-source voltage of standard device in a particular fabrication process. For example, for a 22 nanometer (nm) process the desired maximum $V_{GS}$ is 1.8V.

In some embodiments, the tracking current source includes a pair of MOS transistors having a first transistor coupled between the input voltage ($V_{BAT}$) and the output and a second transistor, and a differential amplifier having an output coupled to gates of the first and second transistors and operable to control the first and second transistors. Generally, the differential amplifier includes an inverting input coupled to the input voltage ($V_{BAT}$) through a first resistor (R1) of a voltage divider and to ground through a second resistor (R2) of the voltage divider, and a non-inverting input on which the reference voltage is applied coupled to a drain of the second transistor and to ground through a third resistor (R3).

In one embodiment, the third resistor (R3) is coupled to ground through a voltage source ($V_1$) having a voltage equal to:

$$V_1 = V_{GS}\left(\frac{R_1 + R_2}{R_2}\right)$$

where $V_{GS}$ is the preselected maximum gate-source voltage for the fabrication process, $R_1$ is the resistance of the first resistor, and $R_2$ is the resistance of the second resistor.

In another embodiment, the floating-rail reference generator further includes a reference current source ($I_1$) through which the non-inverting input, drain of the second transistor and the third resistor (R3) are coupled to the input voltage ($V_{BAT}$), wherein $I_1$ has a current equal to:

$$I_1 = V_{GS}\left(\frac{R_1 + R_2}{R_2}\right)$$

where $V_{GS}$ is the preselected maximum gate-source voltage for the fabrication process, $R_1$ is the resistance of the first resistor, and $R_2$ is the resistance of the second resistor.

In either of these embodiments, where $V_{GS}$ is equal to 1.8V, $V_{SSHV\_REF}$ equals $V_{BAT}$–1.8 V for $V_{BAT}$ between 1.8 V and 4.8 V, and $V_{SSHV\_REF}$ equals 0 V for $V_{BAT}$ less than 1.8 V, and a total current through the floating-rail reference generator is less than 100 nano-amperes (nA).

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 1 is a schematic diagram of a conventional floating-rail reference generator;

DETAILED DESCRIPTION

A floating-rail reference generator and method for generating a floating-rail reference are provided. The generator and methods of the present disclosure are particularly useful in portable and low-power applications such as in a power management unit (PMU) or switching regulator (SR) for Bluetooth (BT) radios, Wi-Fi hubs or receivers, and other microcontroller units (MCU).

In the following description, for purposes of explanation, numerous specific details are set forth in order to provide a thorough understanding of the present invention. It will be evident, however, to one skilled in the art that the present invention can be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to 'couple' as used herein can include both to directly electrically connect two or more components or elements and to indirectly connect through one or more intervening components.

Figure 2:
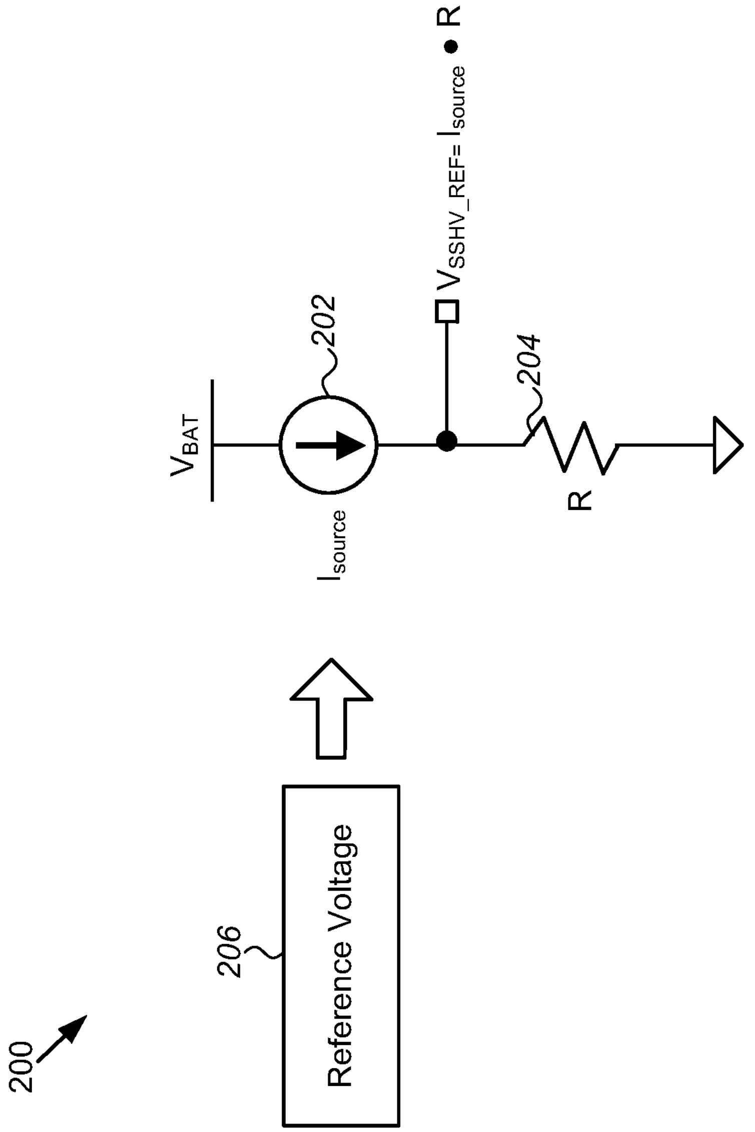
FIG. 2 is a block diagram of a low power floating-rail reference generator.

FIG. 2 is a schematic block diagram of a first embodiment of a floating-rail reference generator. Briefly, the floating-rail reference generator 200 includes a tracking current source 202 coupled in series with a current scaling resistor 204 between an input voltage ($V_{BAT}$) and ground. The tracking current source 202 is operable to receive a reference voltage 206 and generate a tracking current (Isource) through the current scaling resistor 204 to produce a floating-rail reference voltage ($V_{SSHV\_REF}$) at an output between the tracking current source current and scaling resistor. Eliminating the PMOS diode (PMOS transistor 108) and NMOS current sink 110 from the existing floating-rail architecture (floating-rail 100 in FIG. 1) yields a floating-rail reference voltage ($V_{SSHV\_REF}$) as shown in equation 1 below.

$$V_{SSHV\_REF} = \left(\frac{V_{BAT}}{k} - \frac{V_{GS}}{k}\right) \cdot \frac{1}{R} \cdot k \cdot R \qquad (1)$$

where Vs is a preselected or desired constant potential difference between $V_{BAT}$ and $V_{SSHV\_REF}$, k is a voltage scaling ratio, and R is a resistance of the current scaling resistor. $V_{GS}$ represents a preselected maximum gate-source voltage for the fabrication process.

For example, for reasons given above, $V_{GS}$ is selected to have predetermined voltage equal to 1.8V to limit the voltage across gate oxides (Gox) of logic devices supplied by a PMU or SR including the floating-rail reference generator 200 to 1.8V as required in 28 nanometers (nm) and 22 nm technologies and beyond. Thus, $V_{SSHV\_REF}$ equals $V_{BAT}$–1.8 V for $V_{BAT}$ voltages between 1.8 V and 4.8 V, and $V_{SSHV\_REF}$ equals 0 V for $V_{BAT}$ less than 1.8 V.

Figure 3:
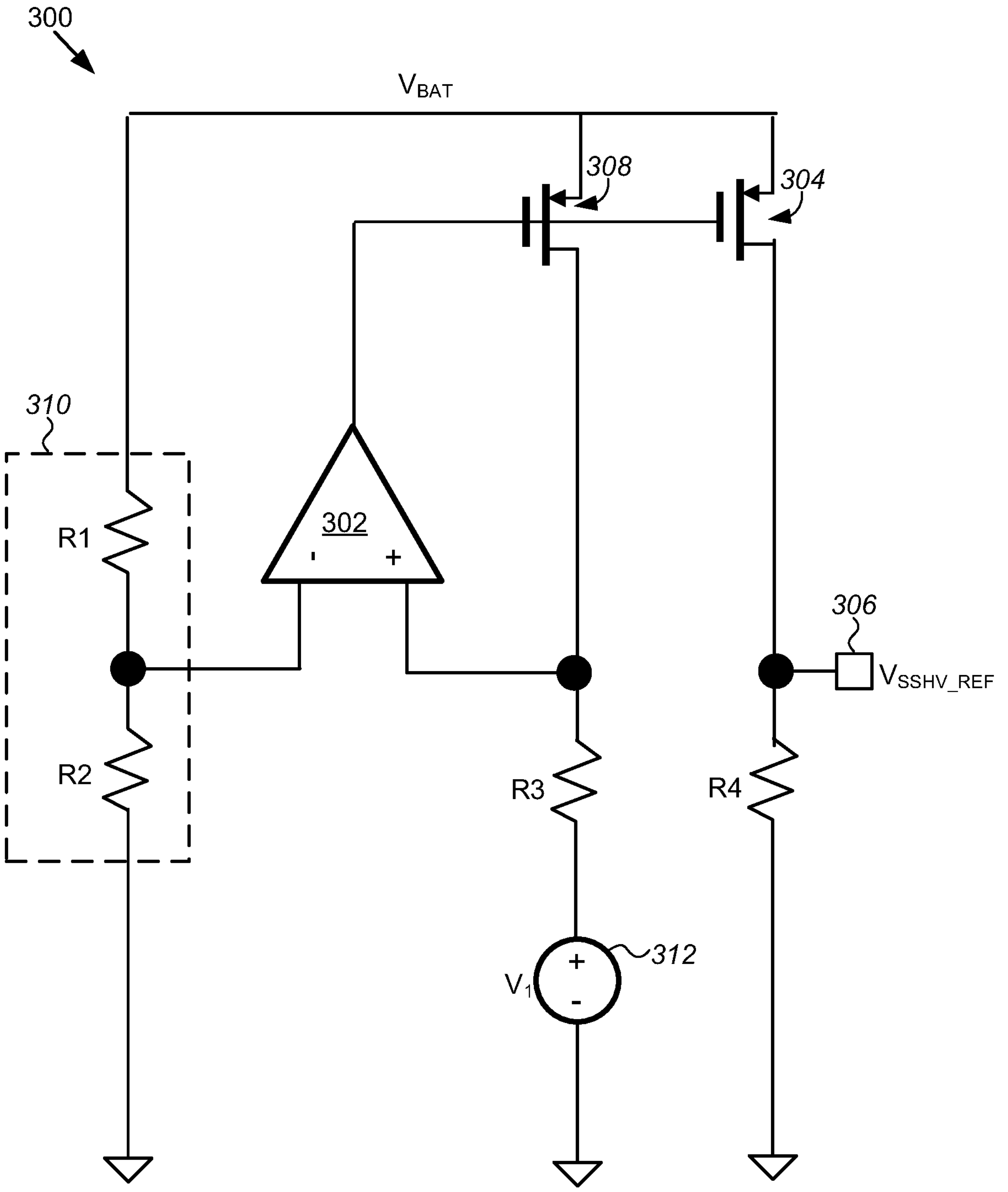
FIG. 3 is a schematic diagram of a low power floating-rail reference generator according to an embodiment of the present disclosure.

FIG. 3 is a schematic circuit diagram of a floating-rail reference generator 300 according to a first embodiment in which a reference voltage is provided by an output of a differential amplifier 302 and the current source is implemented using a pair of transistors controlled by the differential amplifier. The pair of transistors include a first transistor 304 coupled between the input voltage ($V_{BAT}$) and an output 306, and a second transistor 308. In some embodiments, such as that shown, the pair of transistors include p-type or p-channel MOS (PMOS) transistors.

The differential amplifier 302 can be implemented using a one-stage differential operational amplifier (Opamp), as in the embodiment shown, or using a number of discrete transistors. In either case the differential amplifier 302 has an output coupled to gates of the first and second transistors 304, 308, and is operable to control the first and second transistors. The differential amplifier 302 can further include an inverting input coupled to the input voltage ($V_{BAT}$) through a first resistor (R1) of a voltage divider 310 and to ground through a second resistor (R2) of the voltage divider, and a non-inverting input coupled to a drain of the second transistor 308 and to ground through a third resistor (R3).

The floating-rail reference voltage ($V_{SSHV\_REF}$) generated across a fourth resistor (R4) coupled between the output 306 and ground.

In this embodiment the $V_{GS}$ of equation 1 is the desired maximum gate-source voltage for transistors formed by an allowable process (for example is selected to be 1.8V for a 22 nm process), the voltage scaling ratio (k) is equal to a resistance of the second resistor (R2) divided by a sum of resistances of the first resistor (R1) and second resistor (R2) or k=R2/(R1+R2), and a resistance of the fourth resistor (R4), or current scaling resistor, is equal to a product of the resistance of the second resistor (R2) and a resistance of the third resistor (R3) divided by a sum of resistances of the first resistor (R1) and second resistor (R2).

Thus, as with the embodiment of FIG. 2, the floating-rail reference voltage ($V_{SSHV\_REF}$) for the floating-rail reference generator 300 of FIG. 3 equals $V_{BAT}$−1.8 V for $V_{BAT}$ voltages between 1.8 V and 4.8 V, and $V_{SSHV\_REF}$ equals 0 V for $V_{BAT}$ less than 1.8 V.

Additionally, it is noted that the floating-rail reference generator 300 is as low power floating-rail reference generator having a total current consumption less than about 100 nano-amperes (nA).

In the embodiment shown, the floating-rail reference generator 300 further includes a voltage source 312 through which the third resistor (R3) is coupled to ground to set the non-inverting input to the differential amplifier 302. The voltage source is selected or operated to have a predetermined voltage ($V_1$) as shown in equation 2 below.

$$V_1 = V_{GS}\left(\frac{R_1 + R_2}{R_2}\right) \tag{2}$$

where $V_{GS}$ is the desired maximum gate-source voltage, $R_1$ is the resistance of the first resistor, and $R_2$ is the resistance of the second resistor.

Figure 4:
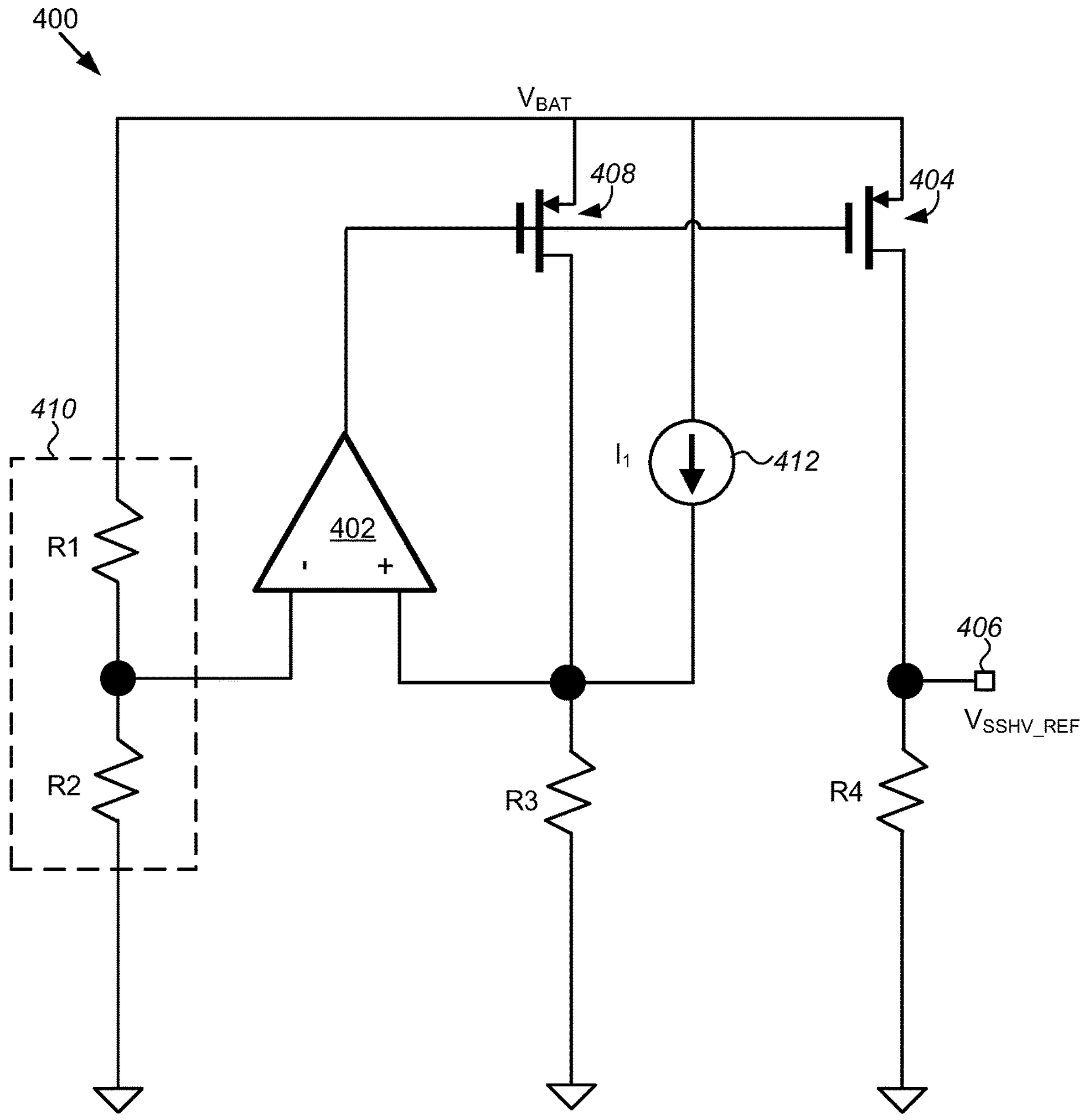
FIG. 4 is a schematic diagram of a low power floating-rail reference generator according to an embodiment of the present disclosure.

In another embodiment, shown in FIG. 4 a current source coupled between the DC input ($V_{BAT}$) and ground through a resistor is used to generate a non-inverting input to a differential amplifier used to control transistors to generate a floating-rail reference voltage ($V_{SSHV\_REF}$).

Referring to FIG. 4, the floating-rail reference generator 400 includes a differential amplifier 402 having an output coupled to and operable to control gates of a pair of transistors. The pair of transistors include a first transistor 404 coupled between the input voltage ($V_{BAT}$) and the output 406, and a second transistor 408. The pair of transistors are shown as PMOS transistors.

Also, the differential amplifier 402 can be implemented using a one-stage differential Opamp, and further includes an inverting input coupled to the input voltage ($V_{BAT}$) through a first resistor (R1) of a voltage divider 410 and to ground through a second resistor (R2) of the voltage divider, and a non-inverting input coupled to a drain of the second transistor 408 and to ground through a third resistor (R3). The floating-rail reference voltage ($V_{SSHV\_REF}$) generated across a fourth resistor (R4) coupled between the output 406 and ground.

In this embodiment the $V_{GS}$ of equation 1 is the desired maximum gate-source voltage (selected to be 1.8V in a 22 nm process), the voltage scaling ratio (k) is equal to a resistance of the second resistor (R2) divided by a sum of resistances of the first resistor (R1) and second resistor (R2) or k=R2/(R1+R2), and a resistance of the fourth resistor (R4), or current scaling resistor, is equal to a product of the resistance of the second resistor (R2) and a resistance of the third resistor (R3) divided by a sum of resistances of the first resistor (R1) and second resistor (R2). Thus, as with the embodiments of FIGS. 2 and 3, the floating-rail reference voltage ($V_{SSHV\_REF}$) for the floating-rail reference generator 400 of FIG. 4 equals $V_{BAT}$−1.8 V for $V_{BAT}$ voltages between 1.8 V and 4.8 V, and $V_{SSHV\_REF}$ equals 0 V for $V_{BAT}$ less than 1.8 V. Additionally, it is noted that the floating-rail reference generator 400 is as low power floating-rail reference generator having a total current consumption less than about 100 nA.

In the embodiment shown, the floating-rail reference generator 400 further includes a current source 412 through which the third resistor (R3) is coupled to $V_{BAT}$ to set the non-inverting input to the differential amplifier 402. The current source is selected or operated to have a predetermined current ($I_1$) as shown in equation 3 below.

$$I_1 = V_{GS}\left(\frac{R_1 + R_2}{R_2}\right) \tag{3}$$

where $V_{GS}$ is a preselected or desired maximum gate-source voltage (selected to be 1.8V in a 22 nm process), $R_1$ is the resistance of the first resistor, $R_2$ is the resistance of the second resistor and R3 is the resistance of the third resistor.

Figure 5:
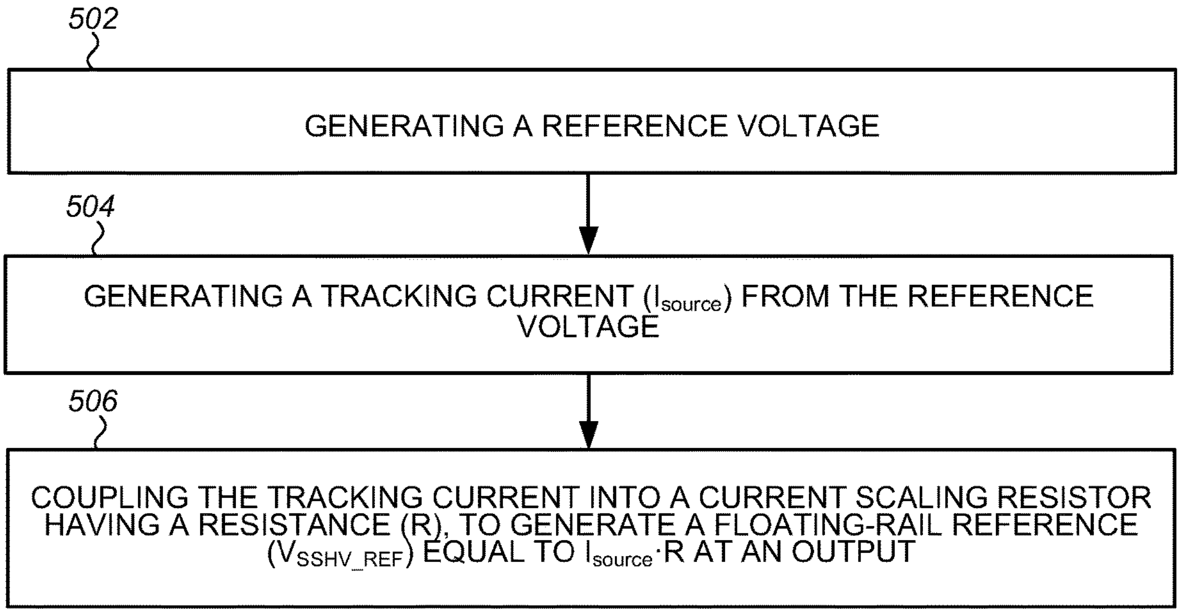
FIG. 5 is a flowchart illustrating a method for operating a low power floating-rail reference generator.

FIG. 5 is a flowchart illustrating a method for operating a low power floating-rail reference generator. Referring to FIG. 5, the method generally includes generating a reference voltage (step 502); generating a tracking current ($I_{source}$) from the reference voltage (step 504); and coupling the tracking current into a current scaling resistor having a resistance (R), to generate a floating-rail reference voltage ($V_{SSHV\_REF}$) equal to $I_{source}$·R at an output (step 506).

Generally, as described above with respect to FIGS. 3 and 4, generating the tracking current (step 504) is accomplished by controlling a pair of MOS transistors including a first transistor with a source coupled to the input voltage ($V_{BAT}$) and a drain coupled to the output, and a second transistor coupled to $V_{BAT}$, using a differential amplifier with an output coupled to gates of the first and second transistors. The differential amplifier includes an inverting input coupled to $V_{BAT}$ through a first resistor (R1) of a voltage divider and to ground through a second resistor (R2) of the voltage divider, and a non-inverting input coupled to a node between a drain of the second transistor and a third resistor (R3) through which the node is coupled to ground.

In embodiments, such as described in FIG. 3, the floating-rail reference generator further includes a voltage source having a voltage ($V_1$), and generating the reference voltage (step 502) includes generating an input to the non-inverting input of the differential amplifier by coupling the third resistor (R3) to ground through the voltage source ($V_1$).

In other embodiments, such as described in FIG. 4, the floating-rail reference generator further includes a current source having a current ($I_1$), and generating the reference voltage (step 502) includes generating an input to the non-inverting input of the differential amplifier by coupling the non-inverting input of the differential amplifier to $V_{BAT}$ through the current source.

Figure 6:
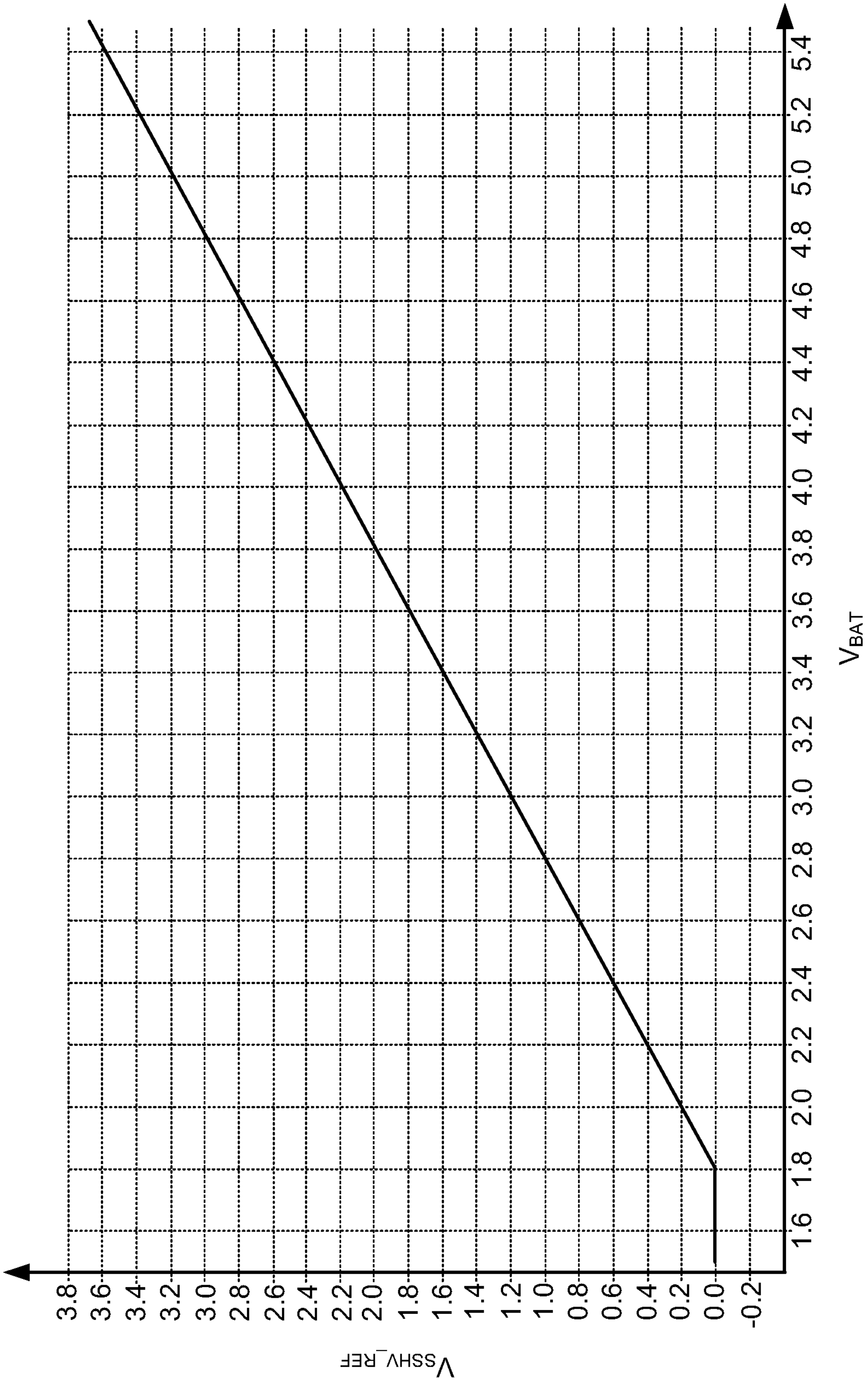
FIG. 6 is a graph of floating-rail voltage ($V_{SSHV\_REF}$) versus battery voltage ($V_{BAT}$) illustrating the ability of the floating-rail reference generator of the present disclosure to operate continuously with battery voltages from 1.6V to 4.8 V.

FIG. 6 is a graph of floating-rail voltage ($V_{SSHV\_REF}$) versus battery voltage ($V_{BAT}$) illustrating the ability of the floating-rail reference generator of either FIG. 3 or 4 to operate continuously with battery voltages from 1.6V to 4.8 V. In particular, it is noted that from the floating-rail reference generators of the present disclosure are operable to provide a stable $V_{SSHV\_REF}$ at battery voltages ($V_{BAT}$) from about 1.5V to about 1.8V, and steadily increasing $V_{SSHV\_REF}$ voltages equal to about $V_{BAT}$−1.8V at battery voltages from about 1.8V to about 4.8V.

Figure 7:
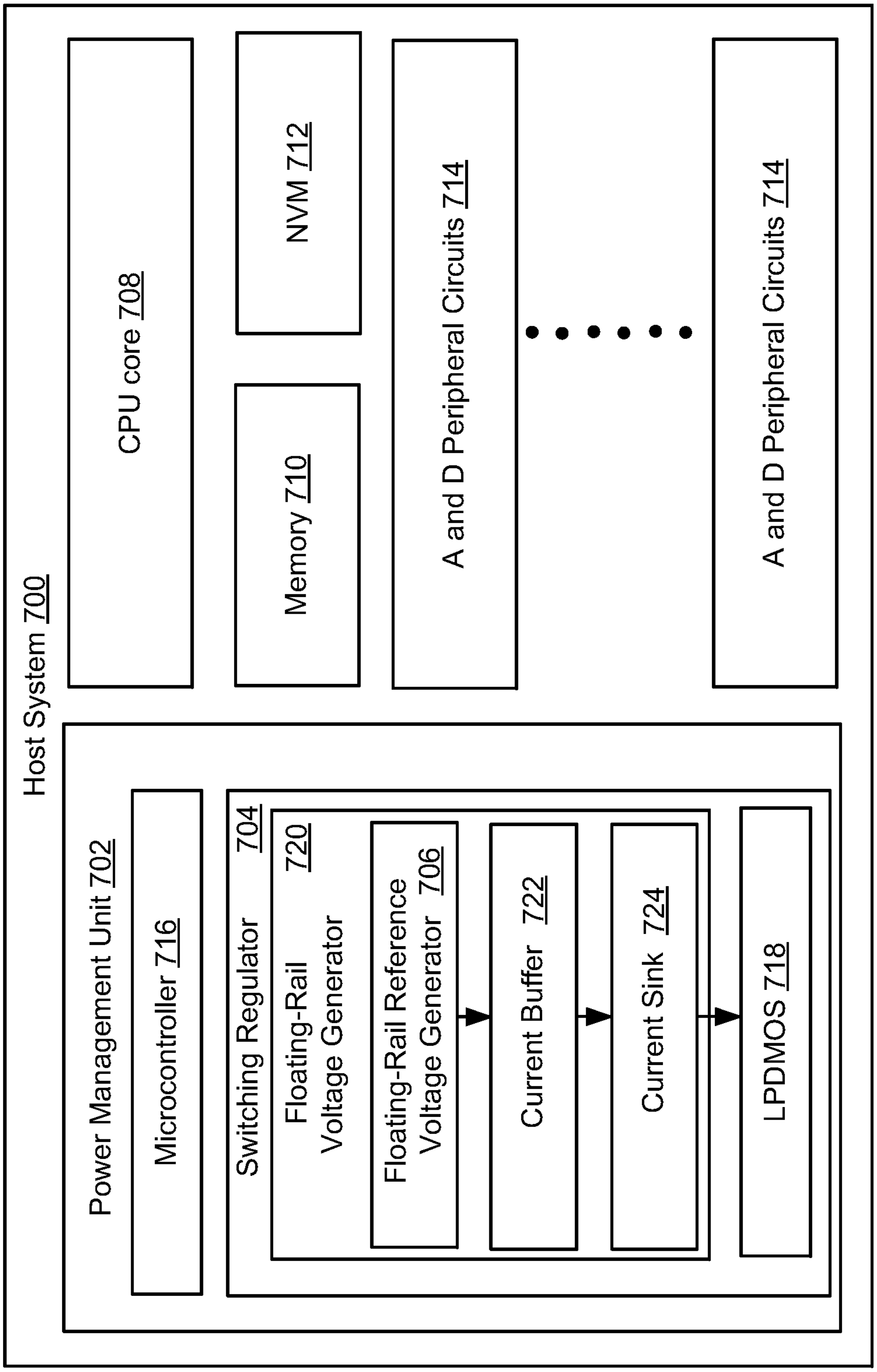
FIG. 7 is block diagram of a host system having a power management unit (PMU) with a switching regulator (SR) for which the floating-rail reference generator of the present disclosure is particularly useful.

FIG. 7 is block diagram of a host system 700 having a power management unit (PMU 702) with a switching regulator (SR 704) for which the floating-rail reference generator 706 of the present disclosure is particularly useful.

Referring to FIG. 7, the host system 700 is generally a microcontroller unit (MCU) or programmable systems on a chip (PSoC) and can include a CPU core 708, volatile memory 710 and non-volatile memory (NVM 712), and a number of configurable integrated analog and digital peripheral circuits 714. Such MCUs are widely used in many automotive, and portable or non-portable electronic applications. Exemplary applications can include Bluetooth radios, and Wi-Fi hubs or receivers. The PMU can include, in addition to the SR 704, a microcontroller 716 that controls the SR 704 and governs power functions of host system 700.

The SR 704 is operable to convert a voltage from a battery or other DC power source into output voltages required by other subsystems or devices in the host system 700. The SR 704 generally includes a high-side switch transistor, such as a laterally-diffused PMOS (LDPMOS) transistor 718, controlled by or receiving a floating-rail voltage ($V_{SSHV}$) from a floating-rail voltage generator 720 to supply the required output voltages. In addition to the floating-rail reference generator 706 of the present disclosure, the floating-rail voltage generator 720 can further include a current buffer 722 and a current sink 724 to buffer and shift a voltage generated using the $V_{SSHV\_REF}$ generated by the floating-rail reference generator 706 and to sink transients in a load current, which can undesirably impact $V_{SSHV}$. Using the floating-rail reference generator 706 of the present disclosure to generate $V_{SSHV}$ and operate the SR 704 ensures that logic transistors and other devices in the host system 700 are not exposed to voltages across their gate oxides exceeding the maximum 1.8V limit required for 28 nm and 22 nm technologies and beyond.

Thus, floating-rail reference generators and methods of operating the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A floating-rail reference generator comprising a tracking current source coupled in series with a current scaling resistor between an input voltage ($V_{BAT}$) and ground, the tracking current source operable to receive a reference voltage and generate a tracking current (Isource) through the current scaling resistor to produce a floating-rail reference voltage ($V_{SSHV\_REF}$) at an output between the tracking current source current and scaling resistor, wherein:

$$V_{SSHV\_REF} = \left(\frac{V_{BAT}}{k} - \frac{V_{GS}}{k}\right) \cdot \frac{1}{R} \cdot k \cdot R$$

where $V_{GS}$ is a constant potential difference between $V_{BAT}$ and $V_{SSHV\_REF}$, k is a voltage scaling ratio, and R is a resistance of the current scaling resistor; and wherein the tracking current source comprises a pair of MOS transistors including a first transistor coupled between the input voltage ($V_{BAT}$) and the output and a second transistor, and a differential amplifier having an output coupled to gates of the first and second transistors and operable to control the first and second transistors, the differential amplifier comprising:

an inverting input coupled to the input voltage ($V_{BAT}$) through a first resistor (R1) of a voltage divider and to ground through a second resistor (R2) of the voltage divider; and a non-inverting input coupled to a drain of the second transistor and to ground through a third resistor (R3).

2. The floating-rail reference generator of claim 1 wherein $V_{GS}$ equals 1.8V, and $V_{SSHV\_REF}$ equals $V_{BAT}$−1.8 V for $V_{BAT}$ between 1.8 V and 4.8 V, and $V_{SSHV\_REF}$ equals 0 V for $V_{BAT}$ less than 1.8 V.

3. The floating-rail reference generator of claim 2 wherein a total current through the floating-rail reference generator is less than 100 nano-amperes (nA).

4. The floating-rail reference generator of claim 1 wherein $V_{GS}$ is a preselected maximum gate-source voltage for a fabrication process, the voltage scaling ratio (k) is equal to a resistance of the second resistor (R2) divided by a sum of resistances of the first resistor (R1) and second resistor (R2), and a resistance of the current scaling resistor is equal to a product of the resistance of the second resistor (R2) and a resistance of the third resistor (R3) divided by a sum of resistances of the first resistor (R1) and second resistor (R2).

5. The floating-rail reference generator of claim 4 wherein the third resistor (R3) is coupled to ground through a voltage source ($V_1$) and wherein:

$$V_1 = V_{GS}\left(\frac{R_1 + R_2}{R_2}\right)$$

where $V_{GS}$ the preselected maximum gate-source voltage, $R_1$ is the resistance of the first resistor, and $R_2$ is the resistance of the second resistor.

6. The floating-rail reference generator of claim 5 wherein a total current through the floating-rail reference generator is less than 100 nano-amperes (nA).

7. The floating-rail reference generator of claim 4 further comprising a reference current source ($I_1$) through which the non-inverting input, drain of the second transistor and the third resistor (R3) are coupled to the input voltage ($V_{BAT}$), and wherein:

$$I_1 = V_{GS}\left(\frac{R_1 + R_2}{R_2}\right)$$

where $V_{GS}$ is the preselected maximum gate-source voltage, $R_1$ is the resistance of the first resistor, and $R_2$ is the resistance of the second resistor.

8. The floating-rail reference generator of claim 7 wherein a total current through the floating-rail reference generator is less than 100 nano-amperes (nA).

9. A method of generating a floating-rail reference voltage comprising:

generating a reference voltage;

generating a tracking current (Isource) from the reference voltage; and coupling the tracking current (Isource) into a current scaling resistor having a resistance (R), to generate a floating-rail reference voltage ($V_{SSHV\_REF}$) equal to Isource·R at an output, wherein generating the tracking current comprises controlling a pair of MOS transistors including a first transistor coupled between an input voltage ($V_{BAT}$) and the output, and a second transistor, using a differential amplifier having an output coupled to gates of the first and second transistors, and wherein the differential amplifier comprises an inverting input coupled to the input voltage ($V_{BAT}$) through a first resistor (R1) of a voltage divider and to ground through a second resistor (R2) of the voltage divider, and a non-inverting input coupled to the reference voltage.

10. The method of claim 9 wherein generating the reference voltage comprises coupling the non-inverting input of the differential amplifier to a drain of the second transistor and to ground through a third resistor (R3) and a voltage source ($V_1$) coupled between the third resistor and ground, wherein:

$$V_1 = V_{GS}\left(\frac{R_1 + R_2}{R_2}\right)$$

where $V_{GS}$ is a preselected maximum gate-source voltage for a fabrication process, $R_1$ is the resistance of the first resistor, and $R_2$ is the resistance of the second resistor.

11. The method of claim 9 wherein generating the reference voltage comprises coupling the non-inverting input of the differential amplifier to a drain of the second transistor and to ground through a third resistor (R3), and to the input voltage ($V_{BAT}$) through a reference current source ($I_1$) coupled between the third resistor and the input voltage ($V_{BAT}$), wherein:

$$I_1 = V_{GS}\left(\frac{R_1 + R_2}{R_2}\right)$$

where $V_{GS}$ is a preselected maximum gate-source voltage for a fabrication process, $R_1$ is the resistance of the first resistor, and $R_2$ is the resistance of the second resistor.

12. The method of claim 9 wherein:

$$V_{SSHV\_REF} = \left(\frac{V_{BAT}}{k} - \frac{V_{GS}}{k}\right) \cdot \frac{1}{R} \cdot k \cdot R$$

where $V_{GS}$ is a preselected maximum gate-source voltage for a fabrication process, R is a resistance of the current scaling resistor, and k is a voltage scaling ratio equal to a resistance of the second resistor (R2) divided by a sum of resistances of the first resistor (R1) and second resistor (R2).

13. The method of claim 9 wherein a maximum gate-source voltage ($V_{GS}$) for the first transistor when fabricated using a 22 nm fabrication process is 1.8V, and wherein generating the floating-rail reference voltage comprises generating a $V_{SSHV\_REF}$ equal to $V_{BAT}$–$V_{GS}$ for $V_{BAT}$ between 1.8 V and 4.8 V, and a $V_{SSHV\_REF}$ equal to 0 V for $V_{BAT}$ less than 1.8 V.

14. A floating-rail reference generator comprising:

a current scaling resistor coupled between an output and ground, wherein a floating-rail reference voltage ($V_{SSHV\_REF}$) at the output:

$$V_{SSHV\_REF} = \left(\frac{V_{BAT}}{k} - \frac{V_{GS}}{k}\right) \cdot \frac{1}{R} \cdot k \cdot R$$

where $V_{GS}$ is a preselected maximum gate-source voltage for a fabrication process, R is a resistance of the current scaling resistor, and k is a voltage scaling ratio equal to a resistance of the second resistor (R2) divided by a sum of resistances of the first resistor (R1) and second resistor (R2);

a pair of MOS transistors including a first transistor having a source coupled to an input voltage ($V_{BAT}$) and a drain coupled to the output, and a second transistor having a source coupled to the input voltage ($V_{BAT}$);

a differential amplifier having an output coupled to gates of the first and second transistors and operable to control the first and second transistors, the differential amplifier comprising:

an inverting input coupled to the input voltage ($V_{BAT}$) through a first resistor (R1) of a voltage divider and to ground through a second resistor (R2) of the voltage divider; and a non-inverting input coupled to a drain of the second transistor and to ground through a third resistor (R3).

15. The floating-rail reference generator of claim 14 wherein the third resistor (R3) is coupled to ground through a voltage source ($V_1$) and wherein:

$$V_1 = V_{GS}\left(\frac{R_1 + R_2}{R_2}\right)$$

where $V_{GS}$ the preselected maximum gate-source voltage for the fabrication process, $R_1$ is the resistance of the first resistor, and $R_2$ is the resistance of the second resistor.

16. The floating-rail reference generator of claim 15 further comprising a reference current source ($I_1$) through which the non-inverting input, drain of the second transistor and the third resistor (R3) are coupled to the input voltage ($V_{BAT}$), and wherein:

$$I_1 = V_{GS}\left(\frac{R_1 + R_2}{R_2}\right)$$

where $V_{GS}$ the preselected maximum gate-source voltage for the fabrication process, $R_1$ is the resistance of the first resistor, and $R_2$ is the resistance of the second resistor.

17. The floating-rail reference generator of claim 15 wherein $V_{GS}$ is 1.8V, and wherein generating the floating-rail reference voltage comprises generating a $V_{SSHV\_REF}$ equal to $V_{BAT}-V_{GS}$ for $V_{BAT}$ between 1.8 V and 4.8 V, and a $V_{SSHV\_REF}$ equal to 0 V for $V_{BAT}$ less than 1.8 V.

18. The floating-rail reference generator of claim 17 wherein a total current through the floating-rail reference generator is less than 100 nano-amperes (nA).

* * * * *